Figure 6:
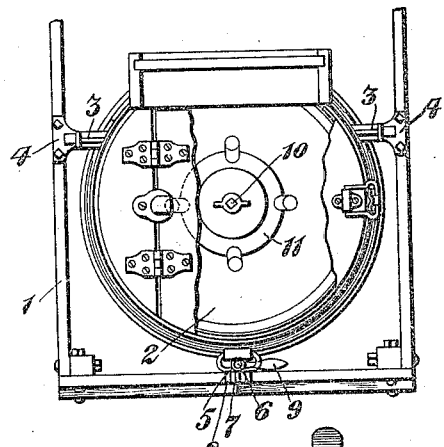

C. J. MARTH.
GEARING.
APPLICATION FILED FEB. 23, 1915.

1,177,123.

Patented Mar. 28, 1916.
3 SHEETS—SHEET 1.

Attest:
Charles A. Becker

Inventor.
Charles J. Marth,
by
His Attorneys

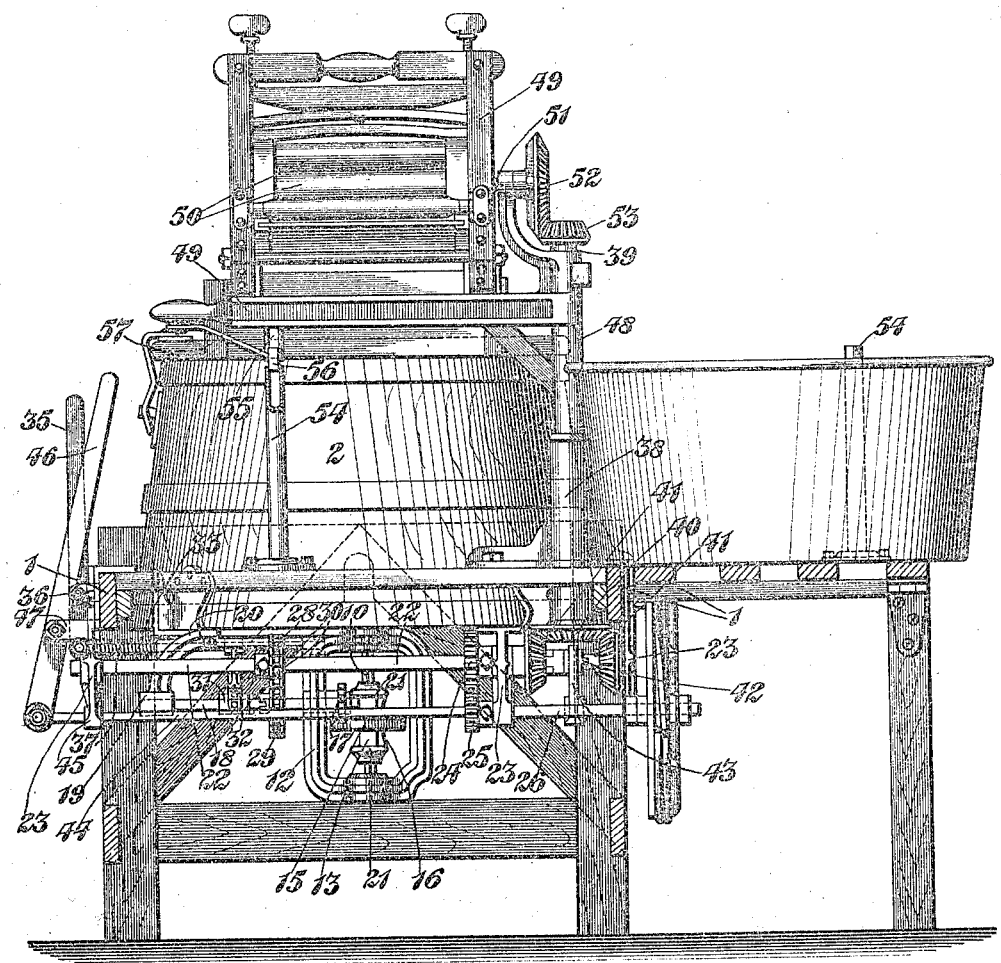

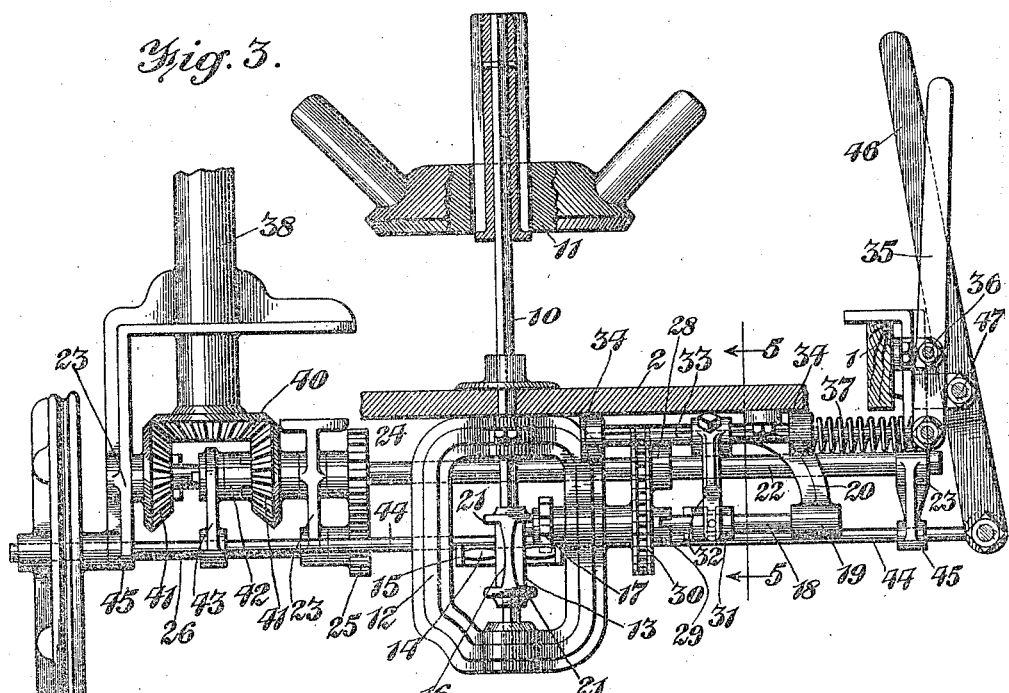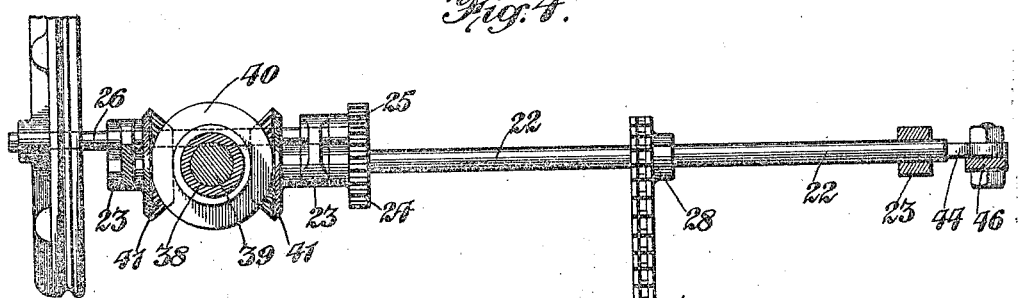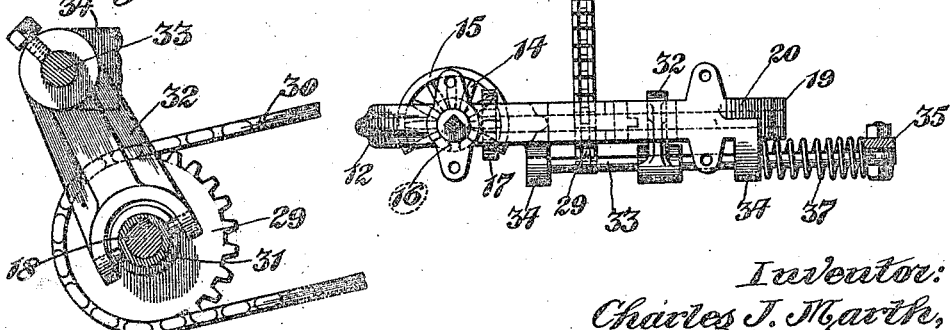

UNITED STATES PATENT OFFICE.

CHARLES J. MARTH, OF ST. LOUIS, MISSOURI, ASSIGNOR TO WAYNE MANUFACTURING COMPANY, OF ST. LOUIS, MISSOURI, A CORPORATION OF MISSOURI.

GEARING.

1,177,123.  Specification of Letters Patent.  Patented Mar. 28, 1916.

Original application filed July 24, 1912, Serial No. 711,246. Divided and this application filed February 23, 1915. Serial No. 10,164.

*To all whom it may concern:*

Be it known that I, CHARLES J. MARTH, a citizen of the United States, residing at the city of St. Louis and State of Missouri, have invented a new and useful Gearing, of which the following is a specification.

This invention relates to gearings, and it has particular reference to gearings for use in connection with laundry machines.

This application is a division of my prior application, Serial No. 711,246, filed July 24, 1912, and the mechanism illustrated, described and claimed herein is a part of the mechanism embodied in the machine constituting the subject matter of the said prior application. It will be understood, however, that I do not restrict myself to the use of the subject matter of the two applications in combination with each other except where such combination is made the essence of claims.

An object of the invention is to provide a gearing including a horizontal drive shaft mounted below a support and provided with driving connections whereby said shaft will be constantly rotated in one direction, a second shaft mounted below the support and driven by the drive shaft, a support movably mounted on the first-named support and carrying a vertical shaft which extends below both supports, and suitable actuating connections between the second horizontal shaft and the vertical shaft for imparting an alternating rotary motion to the vertical shaft by the constant rotation of the second shaft in one direction.

Another object of the invention is to provide a gearing for laundry machines comprising a horizontal drive shaft mounted below a support, a vertical shaft driven in an alternating rotary manner by the constant rotation of the drive shaft in one direction for operating on the work during one stage of its treatment, in combination with another vertical shaft, mechanism driven by the last-named vertical shaft for operating on the same work during its treatment after the vertical alternating rotary shaft had operated on the work, means for supporting said mechanism in various positions with respect to said alternating rotary shaft, and means for driving said second-named vertical shaft in either direction by the constant rotation of the horizontal shaft in one direction.

Other objects will appear from the following description, reference being made to the accompanying drawings in which I have illustrated one embodiment of my invention, and in which—

Figure 1:
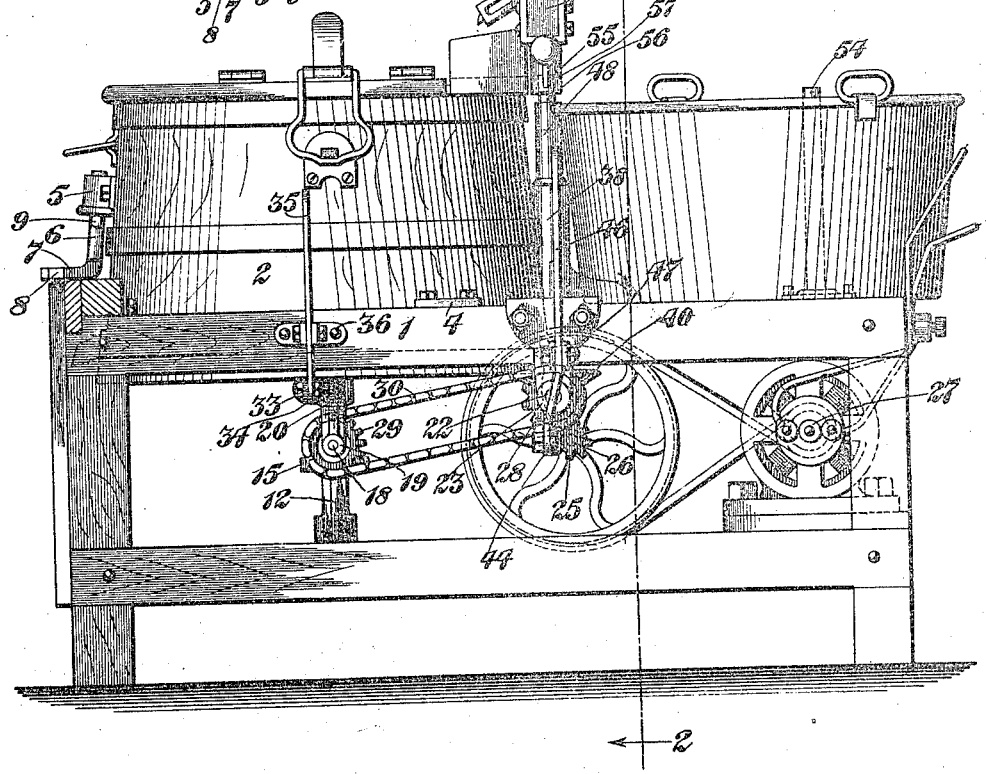

Figure 1 is a side elevation of a laundry machine embodying my invention. Fig. 2 is a sectional view on the line 2—2 of Fig. 1. Fig. 3 is a detailed view illustrating the gearing whereby the horizontal drive shaft imparts an alternating rotary motion to one vertical shaft and a constant rotary motion in either direction to another vertical shaft. Fig. 4 is a plan view of a part of the gearing whereby one of the vertical shafts is rocked by the constant rotation of the drive shaft in one direction, and the other vertical shaft is constantly rotated in either direction by the constant rotation of the drive shaft in one direction. Fig. 5 is a sectional view on the line 5—5 of Fig. 3. Fig. 6 is a plan view of the movable support on the stationary support, each of which carries a part of the gearing.

The laundry machine in which I have chosen to illustrate the present invention consists of a stationary portable support 1 which is in the form of a frame provided with supporting legs. Upon the stationary support is mounted a removable support 2, comprising a tub or receptacle in which the washing is effected. The support or tub 2 is movably supported by the stationary support 1. The devices by which the supporting tub 2 is movably supported comprise trunnions 3 secured to the outer side of the tub and mounted in stirrup bearings 4 attached to the support 1. The trunnions 3 thus constituting axial members for supporting two sides of the tub, a third side being provided with a bracket bearing 5 which carries a revoluble member 6 having an arm 7 arranged to engage with a latch member 8 on the support 1, and thus hold the supporting tub in level adjustment. The member 6 is provided with a handle 9 whereby said member may be turned to release the arm 7 from the latch 8 and permit the tub to be tilted or inclined, it being understood that the side of the tub on which the supporting member 6 is mounted will be lowered when the arm 7 is released from the support 1. In this adjustment the handle 9 extends over the upper part of the support 1 and holds the supporting tub in its inclined position.

An agitator shaft 10 extends vertically through the bottom of the supporting tub, and carries on its upper end a dolly member 11 which may be of any preferred construction. The shaft 10 extends below the supporting tub, and is journaled in the upper and lower sides of a frame 12 which, in the construction illustrated, is attached to the bottom of the tub. A sleeve 13 is provided with a polygonal opening which receives a correspondingly shaped portion of the shaft 10, so that said sleeve is vertically movable upon the shaft between the upper and lower parts of the frame 12, but said sleeve is not revoluble with respect to the shaft. The sleeve 13 supports a series of radial teeth 14 which, as illustrated, may be in the form of the spokes of a wheel preferably having their outer ends integrally united with a rim part 15 whereby said teeth are strengthened. The teeth 14 extend approximately two thirds of the distance around the sleeve 13, thus leaving an open space to enable the sleeve and the teeth 14 to move vertically with respect to the actuating pinion with which said teeth meshed. At the side of the sleeve 13 on which there are no teeth there is formed a shoulder or abutment 16 having grooved walls on its opposite sides against which operates the abutment, by which rotation of the shaft 10 is stopped so that said shaft will be given an alternating rotary or rocking movement.

The actuating pinion 17 which meshes with the teeth 14 is attached to a shaft 18 one end of which is journaled in a bearing formed in the frame 12 and the other end of which is journaled in a bearing 19 formed in an arm 20 which is integrally connected with the frame 12, and the other end of which is journaled in a bearing 19 formed in an arm 20 which is integrally connected with the frame 12. The end of the shaft 18 terminates adjacent to the periphery of the sleeve 13 and in the path of movement of the abutment 16, so that when the sleeve has been turned until the abutment 16 engages against the end of the shaft 18 the sleeve 13 will be raised by the continuous rotation of the pinion 17, since the last tooth 14 of the series is engaged between teeth on said pinion 17 in such a manner that the continuous rotation of the pinion 17 will raise the teeth 14 and the sleeve 13 with which they are connected. Vertical movement of the sleeve 13 in opposite directions is limited by flanges 21 adapted to engage with the end of the shaft 18 so as to maintain the pinion 17 and the sleeve 13 in their proper relative adjustments. A drive shaft 22 is journaled in bearings 23 secured to the under side of the support 1, said drive shaft having a pinion 24 thereon which meshes with a pinion 25 on a shaft 26 which is also journaled in bearings supported below the support 1 and which is driven by suitable connections from a motor 27. By means of the motor 27 the shaft 22 will be constantly rotated in one direction when the machine is in use. The shaft 18 is driven from the shaft 22. In the embodiment illustrated the means for driving the shaft 18 from the shaft 22 includes a sprocket wheel 28 attached to the shaft 22 and connected with a sprocket wheel 29 on the shaft 18 by means of a chain 30. The sprocket wheel 29 is loose upon the shaft 18, so that at the option of the operator the shaft 10 may or may not be maintained in operation by the connections from the driving shaft 22, as desired.

In order that the shaft 10 may be operated by the rotation of the shaft 22 it is necessary to clutch the sprocket wheel 29 upon the shaft 18, for this purpose, I provide a releasable clutch member 31 mounted on the shaft 18 and adapted to be moved into and out of engagement with the hub of the sprocket wheel 29. The clutch member 31 is engaged by the arms of a bifurcated member 32 which extend into a circumferential groove on the clutch member, said arms being attached to an axially movable rod 33 supported in bearings 34 on the frame 12 and the arm 20. A lever 35 is pivoted to a support 36 at the side of the frame 1 and the lower end of said lever is pivotally connected to the outer end of the rod 33, said lever constituting manipulative means for actuating said rod to engage the clutch 31 with the hub of the wheel 29. An expansion spring 37 encircles the rod 33 between the outer bearing 34 and the lower end of the lever 35 and normally holds the rod 33 in position to retain the clutch 31 out of engagement with the hub of the wheel 29, thus leaving the wheel 29 free to revolve independently of the shaft 18 on which said wheel is mounted. By operating the lever 35 the rod 33 may be moved inwardly to engage the clutch 31 with the hub of the wheel 29, and when so engaged the clutch will be frictionally held in engagement with the hub of the wheel, the power of the spring 37 being insufficient to overcome the resistance of the frictional engagement. Thus, when the clutch is once engaged it will be retained in engagement until manually released, and the power of the spring 37 is then sufficient to prevent accidental reëngagement of the clutch, when it is desired to operate other portions of the gearing without operating the shaft 10. It will be understood that the mechanism driven by the shaft 10 operates upon the same work during one stage of its treatment that is operated upon by other portions of the gearing driven by the same drive shaft 22, which other portions of the gearing will be presently described.

As previously stated the drive shaft 22 is supported by and below a stationary support 1, and the rock shaft 10 is supported by the independent movable support 2. The said shaft 10 extends above the support 1, and above the abutment of the support 2, and drives a device for operating upon the work during the initial stage of its treatment. Additional devices are supported by the stationary support 1 independently of the movable support 2 for operating upon the same work during the subsequent stages of its treatment, and this additional mechanism is also driven by the drive shaft 22. In the embodiment illustrated a journal bearing in the form of a sleeve 38 is secured to the support 1 and a vertical shaft 39 is journaled in said bearing. The shaft 39 extends below the support 1 and is in rigid connection with a bevel pinion 40 which is in a horizontal plane above the shaft 22. On the shaft 22 two bevel pinions 41 are loosely supported, both being in constant mesh with the pinion 40, the said pinions 41 being in vertical planes. The hubs of the pinions 41 abut against the bearings 23 in which the shaft 22 is journaled and are thereby retained in constant mesh with the pinion 40. A clutch collar 42 is keyed to slide on the shaft 22, and is movable into engagement with the hub of either one or the other of the pinions 41 as desired, so that the vertical shaft 39 may be rotated in either direction by the constant rotation of the shaft 22 in one direction. The collar 42 is engaged by an arm 43 attached to a rod 44 which is supported in bearings 45 below the support 1. A lever 46 is pivoted upon a support 47 at the side of the support 1, and has its lower end connected with the rod 44, so that by manipulation of the lever 46 either of the pinions 41 may be clutched upon and driven by the shaft 22.

A sleeve 48 is pivoted upon the shaft 39 and rests upon the upper end of the bearing 38, said sleeve being revoluble about said shaft 39 as an axis. A frame 49 is in connection with the sleeve 48, and supports a mechanism 50 for operating upon the work during different stages of its treatment. The mechanism 50 is driven by a shaft 51 journaled in bearings in the frame 49 and having a beveled pinion 52 on one end thereof in constant mesh with a bevel pinion 53 on the upper end of the shaft 39 above the sleeve 48. Since the shaft 39 may be driven in either direction by the constant rotation of the shaft 22 in one direction, it is obvious that the mechanism 50 may also be driven in either direction at the will of the operator, depending upon the direction in which the shaft 39 is revolving. Upon the support 1 at equal distances from the shaft 39 I provide a series of elements 54 which, in the form shown, are upright tubular posts. The free end of the frame 49 is movable over the series of posts 54 and may be retained in engagement with any one of said posts in order to support the mechanism 50 in position for operating on the work during different and various stages of its treatment. In the form shown I provide a tubular member 55 on the under side of the frame 49 in which is mounted a movable element 56 which is adapted to engage in the upper ends of the posts 54, respectively to hold the frame 49 in its different adjustments about the shaft 39. The element 56 is supported by a resilient carrier 57 having its outer end secured to the frame 49 and its inner end connected to the element 56 and operating in a slot in the side of the tubular member 55. The tension of the resilient carrier 57 is to retain the element 56 in position to extend below the tubular member 55 and in engagement with one of the posts 54, as illustrated in Fig. 2, but by pressing the carrier 57 toward the frame 49 the element 56 may be disengaged from any of the posts 54. By moving the collar 42 to an intermediate position between the hubs of the pinions 41 said collar may be retained disengaged from both of said pinions, thus enabling the shaft 22 to revolve independently of the shaft 39.

Having described my invention, what I claim and desire to secure by Letters Patent is:

1. In a device of the character described, a support, bearings supported by said support at the under side thereof, a horizontal drive shaft journaled in said bearings, additional bearings supported by said support at the under side thereof, a second shaft journaled in said additional bearings, connections for driving said second shaft from said drive shaft, means for rendering said connections operative or inoperative as desired, whereby said drive shaft may operate while said second shaft remains stationary, a support for the work to be operated upon removably mounted on said first-mentioned support, a vertical shaft carried by said removable support and extending below said first-named support and below said second shaft, and devices driven by said second shaft for imparting an alternating rotary motion to said vertical shaft.

2. In a device of the character described, a stationary support, bearings at the under side thereof, a horizontal driving shaft journaled in said support, a support for the work to be operated upon mounted on said stationary support, a vertical shaft mounted in said second support and extending below a part of said stationary support, connections supported by said stationary support for imparting an alternating rotary movement to said vertical shaft by the continuous rotation of said drive shaft in one direction, and a device settable in one position effectively to drive said connections by said drive shaft and in another position to enable said drive shaft to operate without driving said connections.

3. In a gear device of the class described, the combination of a stationary support for supporting the mechanisms for operating upon the work during different stages of its treatment, a horizontal drive shaft supported by said stationary support, an additional support for the work to be operated upon in the first stage of its treatment mounted on said stationary support, an upright shaft journaled in said additional support, connections interposed between drive shaft and said upright shaft for imparting an alternating rotary motion to the upright shaft by the continuous rotation of the drive shaft in one direction, a device settable in one position to drive said connections from said drive shaft and in another position to enable said drive shaft to operate while said connections remain stationary, a vertical shaft supported wholly by said stationary support above said drive shaft, gear wheels interposed between said vertical shaft and said drive shaft for actuating said vertical shaft continuously in either direction, and a device for throwing said vertical shaft out of gear with said drive shaft to enable said drive shaft to operate while said vertical shaft remains stationary.

4. A gearing device of the class described, comprising a unitary support, a drive shaft journaled below said support, an additional support for the work in the first stage of its treatment mounted on said unitary support, an upright shaft wholly supported by said support for the work and projecting into the same and below said unitary support, mechanism controlled by said upright shaft for operating on the work in the first stage of its treatment, devices supported underneath said unitary support arranged to be driven by said drive shaft for imparting an alternating rotary motion to said upright shaft, means for driving said devices from said drive shaft or not, as desired, when said drive shaft rotates, a vertical shaft supported wholly by said unitary support and separately from said support for the work, a gear wheel on the lower end of said vertical shaft, gear wheels arranged to be driven by said drive shaft and meshing with said gear wheel on said vertical shaft, and means for driving either of said last-named gear wheels from said drive shaft whereby said vertical shaft may be rotated in either direction.

5. A gearing device of the class described, comprising a unitary support, a drive shaft journaled below said support, a support for the work in the first stage of its treatment mounted on said unitary support, an upright shaft journaled in said support for the work, a frame supported by said support for the work below said unitary support, a horizontal shaft journaled in said frame, gear devices driven by said horizontal shaft for imparting an alternating rotary motion to said upright shaft, connections arranged to be operated by said drive shaft for driving said horizontal shaft, and a device settable in positions to drive said connections from said drive shaft or leave said connections idle while said drive shaft rotates.

6. A gearing device of the class described, comprising a unitary support, a drive shaft journaled in said support, a support for the work in the first stage of its treatment mounted on said unitary support, a vertical shaft journaled in said support for the work, a countershaft journaled below said unitary support, gearing whereby said countershaft will impart an alternating rotary motion to said vertical shaft, connections for operating said countershaft from said drive shaft, optionally settable means for rendering said connections operative or inoperative as desired, mechanism driven by said vertical shaft for operating on the work during one stage of its treatment, an upright shaft wholly supported by said unitary support independently of said support for the work, mechanism driven by said upright shaft for operating on the work during different successive stages of its treatment, means for holding said mechanism in different positions with respect to said upright shaft, and mechanism supported by said unitary support for rotating said upright shaft in either direction or permitting said upright shaft to remain stationary, as desired.

7. In a gearing device of the character described, the combination of a unitary support for the mechanisms to operate upon the work during successive stages of its treatment, a support for the work during the first stage of its treatment mounted on said unitary support, a vertical shaft carried by said support for the work, a drive shaft wholly supported by said unitary support separately from said support for the work, connections arranged to be driven by said drive shaft for imparting an alternating rotary motion to said vertical shaft by the continuous rotation of said drive shaft, a device settable in different positions whereby said connections may be driven or not during rotation of said drive shaft, an upright shaft wholly supported by said unitary support separately from said support for the work, mechanism wholly supported by said upright shaft and said unitary support and settable in different positions for operating upon the work during successive stages of its treatment, means for operating said mechanism from said upright shaft in any of the positions of said mechanism, and optionally operable devices wholly supported by said unitary support independently of said support for the work for rotating said upright shaft in either direction or permitting said upright shaft to remain idle while said drive shaft continuously rotates in one direction.

8. A gearing device of the class described, comprising a unitary support, a driving shaft journaled below said support, a support for the work in the first stage of its treatment mounted on said unitary support, an upright shaft journaled in said support for the work and extending below the bottom thereof, connections supported wholly below said unitary support for operating said upright shaft from said drive shaft, a device settable in positions to drive said connections from said drive shaft or leave said connections idle while said drive shaft rotates as desired, a vertical shaft carried by said unitary support independently of the support for the work, devices supported below said unitary support for rotating said vertical shaft in either direction by the continuous rotation of said drive shaft in one direction or leaving said vertical shaft stationary while said drive shaft rotates as desired, mechanism settable in different positions about said vertical shaft above said unitary support, and means for driving said mechanism from said vertical shaft in any of its positions.

9. A gearing device of the class described, comprising a unitary support, a support for the work in the first stage of its treatment mounted on said unitary support, an upright shaft extending through the bottom wall of said support for the work, a drive shaft supported below said supports, connections supported below said supports for operating said upright shaft from said drive shaft, a vertical shaft supported by said unitary support, devices supported below said unitary support for driving said vertical shaft in either direction from said drive shaft or leaving said vertical shaft stationary during operation of said drive shaft, a frame pivoted upon said vertical shaft above said unitary support, a mechanism in said frame, means for holding said frame and thereby said mechanism in different positions about said vertical shaft, and means for driving said mechanism in any of its positions from said vertical shaft.

10. A gearing device of the class described, comprising a unitary support, a support for the work in the first stage of its treatment mounted on said unitary support, and provided with a movable cover for the insertion and removal of the work, an upright shaft supported by and extending through the bottom wall of said support for the work, whereby said cover may be moved leaving said upright shaft in continuous rotation, a drive shaft supported below said supports, connections driven by said drive shaft for imparting an alternating rotary motion to said upright shaft, a vertical shaft carried by said unitary support, a mechanism supported by and arranged to swing about said vertical shaft, means for driving said mechanism in any of its positions from said vertical shaft, and a settable device for driving said vertical shaft in either direction by the continuous rotation of said drive shaft in one direction.

In witness whereof, I have signed this specification in the presence of two subscribing witnesses.

CHARLES J. MARTH.

Witnesses:
JOHN D. RIPPEY,
R. M. LAWRENCE.